(No Model.)
H. K. MOWSON & R. F. COREY.
BOLTING CLOTH BRUSH.
No. 542,093. Patented July 2, 1895.
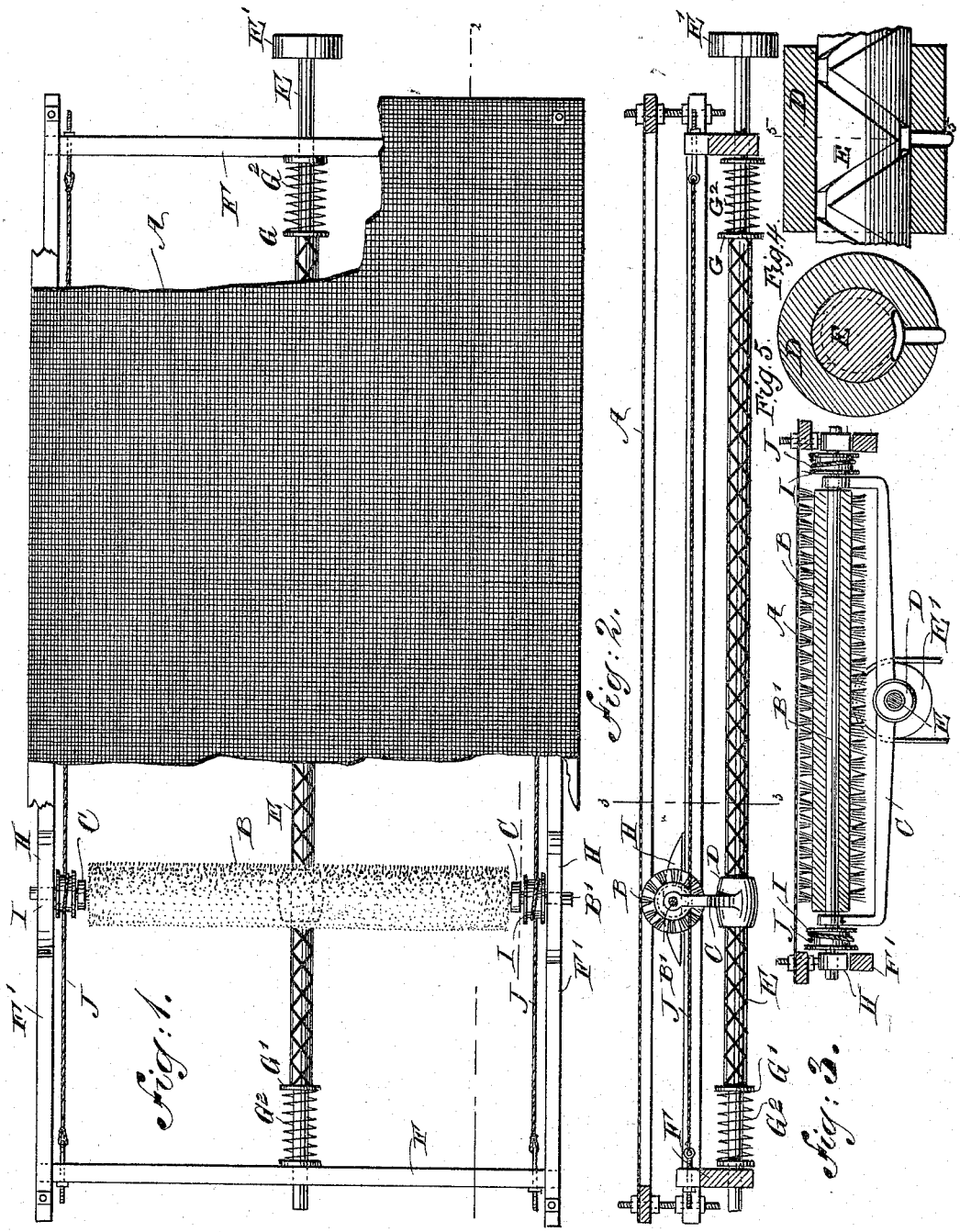
WITNESSES:
INVENTORS
H. K. Mowson
R. F. Corey
BY
Munn & Co
ATTORNEYS.

United States Patent Office.

HARRY K. MOWSON AND ROSWELL F. COREY, OF SCOTTSVILLE, NEW YORK.

BOLTING-CLOTH BRUSH.

SPECIFICATION forming part of Letters Patent No. 542,093, dated July 2, 1895.

Application filed July 10, 1894. Serial No. 517,099. (No model.)

*To all whom it may concern:*

Be it known that we, HARRY KIME MOWSON and ROSWELL FREDERICK COREY, of Scottsville, in the county of Monroe and State of New York, have invented a new and Improved Bolting-Cloth Brush, of which the following is a full, clear, and exact description.

The invention relates to flour-bolts, and its object is to provide a new and improved revolving-brush for cleaning the meshes of the bolting-cloth in a very simple and effective manner.

The invention consists in certain parts and details and combinations of the same, as will be hereinafter fully described and then pointed out in the claims.

Reference is to be had to the accompanying drawings, forming a part of this specification, in which similar letters of reference indicate corresponding parts in all the views.

Figure 1 is a plan view of the improvement, as applied and with parts broken out. Fig. 2 is a sectional side elevation of the same on the line 2 2 of Fig. 1. Fig. 3 is a transverse section of the same on the line 3 3 of Fig. 2. Fig. 4 is an enlarged sectional view of the nut, showing it applied to the screw-rod; and Fig. 5 is a transverse section of the same on the line 5 5 of Fig. 4.

The under side of the bolting-cloth A is engaged by a traveling revolving brush B, mounted to travel forward and backward so as to clean the meshes of the bolting-cloth. The brush B has its shaft B' journaled in a suitable bracket C, carrying a nut D, adapted to engage a right and left hand spiral-cut thread on a longitudinally-extending screw-rod E, journaled in suitable bearings in a frame F, attached to the frame carrying the bolting-cloth, as plainly illustrated in the drawings.

The nut may be constructed in various ways to move upon the screw-rod, and we do not claim any special arrangement for this purpose. In the construction shown we employ a nut having a pivoted tooth which engages and co-operates with the screw-rod. On one outer end of this screw-rod E is secured a pulley E', connected by a belt with a driving part of the mill to impart a continuous rotary motion to the said screw-rod E as long as the mill is in operation.

The nut D is adapted to engage at the ends of the threads on the screw-rod E disks G and G', fitted to slide on reduced portions of the screw-rod and pressed on by springs $G^2$, so that the said disks are yielding on the screw-rods to force the nut D back upon the screw-rod after the said nut has traveled past either end of the threads of the screw-rod. Thus when the nut D travels to the right it finally comes in contact with the disk G, which moves outward on the further forward movement of the nut to compress the spring $G^2$, and as soon as the nut has left the respective thread of the screw-rod it is forced by the disk G back upon the other thread of the screw-rod to move in an opposite direction on the further revolving of the rod E—that is, the nut now travels from the right to the left to carry the brush B in the same direction. When the nut D gets to the left end of the threads of the screw-rod E, it comes in contact with the disk G', which again returns it to the other thread of the screw-rod to cause the nut to travel from the left to the right to carry the brush B in the same direction. The ends of the shaft B' of the brush B are journaled in shoes H, mounted to travel on the side rails F' of the frame F, so as to steady the motion of the brush in its forward and backward movement. Now in order to impart a revolving motion to the forward and backward traveling brush B we provide the shaft B' of the said brush with pulleys I, on each of which is wound a rope J, fastened at its ends to the end rails of the frame F.

It will be seen that when the brush B is moved forward or backward on revolving the screw-rod E, as above described, the said ropes J will unwind on the pulleys I, so that the latter are revolved, and consequently the shaft B' and the brush B. As the brush is in constant contact with the under side of the bolting-cloth A, the meshes of the latter are kept perfectly free at all times, so that the bolting-cloth will work to the greatest advantage and very fine flour will be produced.

Having thus described our invention, we claim as new and desire to secure by Letters Patent—

1. A bolting cloth brush, comprising a brush proper, a support for said brush, a nut connected with the said support a revoluble screw rod provided with right and left hand threads engaging the said nut to impart a traveling motion to the latter, and a spring pressed shifting device arranged at the ends of the screw rod, substantially as described.

2. A bolting cloth brush, comprising a brush proper, a bracket in which the said brush is journaled, a nut on the said bracket, a revoluble screw rod engaging the said nut, to impart a traveling motion to the latter, the said screw rod being provided with right and left hand threads with which the nut engages, and spring-pressed disks held loosely on the screw rod at the ends of the threads of the said screw rod, the said disks serving to return the nut after reaching the ends of the thread on the screw rod, substantially as shown and described.

3. A bolting cloth brush, comprising a brush journaled in a bracket, a nut held on the said bracket, a revoluble screw rod having a right and left hand thread engaging the said nut, pulleys held on the shaft of the said brush, and a rope fixed at its ends and winding on the said pulleys, substantially as shown and described.

4. A bolting cloth brush, comprising a brush journaled in a bracket, a nut held on the said bracket, a revoluble screw rod having a right and left hand thread engaging the said nut, pulleys held on the shaft of the said brush, a rope fixed at its ends and winding on the said pulleys, and shoes held on the ends of the said shaft and adapted to travel on longitudinal rails below the bolting cloth, substantially as shown and described.

HARRY K. MOWSON.
ROSWELL F. COREY.

Witnesses:
HENRY STEARNS,
LEON FRANKLIN.